(12) United States Patent
Gross et al.

(10) Patent No.: US 10,599,343 B2
(45) Date of Patent: Mar. 24, 2020

(54) PROACTIVELY RESILVERING A STRIPED DISK ARRAY IN ADVANCE OF A PREDICTED DISK DRIVE FAILURE

(71) Applicant: Oracle International Corporation, Redwood Shores, CA (US)

(72) Inventors: Kenny C. Gross, Escondido, CA (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 15/947,446

(22) Filed: Apr. 6, 2018

(65) Prior Publication Data
US 2019/0310781 A1 Oct. 10, 2019

(51) Int. Cl.
*G06F 3/00* (2006.01)
*G06F 3/06* (2006.01)

(52) U.S. Cl.
CPC .......... *G06F 3/0619* (2013.01); *G06F 3/0629* (2013.01); *G06F 3/0638* (2013.01); *G06F 3/0653* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,557,123 B1 * | 4/2003 | Wiencko, Jr. | G06F 11/1076 711/114 |
| 7,020,802 B2 | 3/2006 | Gross et al. | |
| 7,702,485 B2 | 4/2010 | Gross et al. | |
| 8,340,923 B2 | 12/2012 | Wood et al. | |
| 10,013,321 B1 * | 7/2018 | Stern | G06F 11/1076 |
| 2015/0178191 A1 * | 6/2015 | Camp | G06F 12/0246 711/103 |

\* cited by examiner

*Primary Examiner* — David Yi
*Assistant Examiner* — Craig S Goldschmidt
(74) *Attorney, Agent, or Firm* — Park, Vaughan, Fleming & Dowler LLP

(57) ABSTRACT

The disclosed embodiments provide a system that proactively resilvers a disk array when a disk drive in the array is determined to have an elevated risk of failure. The system receives time-series signals associated with the disk array during operation of the disk array. Next, the system analyzes the time-series signals to identify at-risk disk drives that have an elevated risk of failure. If one or more disk drives are identified as being at-risk, the system performs a proactive resilvering operation on the disk array using a background process while the disk array continues to operate using the at-risk disk drives.

17 Claims, 6 Drawing Sheets

PROACTIVELY RESILVERING A STRIPED DISK ARRAY IN ADVANCE OF A PREDICTED DISK DRIVE FAILURE

BACKGROUND

Field

The disclosed embodiments generally relate to techniques for improving the reliability of disk-drive-based storage systems. More specifically, the disclosed embodiments relate to a technique for proactively resilvering a striped disk array in advance of a predicted hard disk drive (HDD) failure.

Related Art

Redundant Arrays of Independent Disks (RAID) systems have been used for over 30 years to provide fault tolerance for collections of HDDs. RAID systems operate by distributing data across an array of HDDs using a specific pattern, which depends on the required level of data redundancy and performance. If a single disk drive in a RAID array fails, the data on the failed drive can be reconstructed from redundant data stored on the other drives through a process known as "resilvering." When the RAID architecture was first conceived, it took only five minutes for a RAID array to resilver after an HDD failure. However, as disk drives have increased in density, the resilvering time has increased dramatically. At present, it can takes more than 24 hours to resilver a RAID array after a 1 TB HDD fails, and this resilvering time will continue to increase as disk drive densities continue to increase.

If a second disk drive fails while a RAID array is resilvering, the entire array is lost. This is known as a "partner-pair failure," and such failures are becoming more common as the resilvering times continue to increase. Note that it is possible to prevent the loss of data during such partner-pair failures by backing up the HDDs that comprise a RAID array onto magnetic tape. However, with new multi-TB disk drives, the time required to restore the data from tape can result in many hours of business-critical down time.

Hence, what is needed is a technique for reducing the likelihood of partner-pair failures in RAID disk array systems.

SUMMARY

The disclosed embodiments prove a system that proactively resilvers a disk array when a disk drive in the array is determined to have an elevated risk of failure. During operation, the system receives time-series signals associated with the disk array. Next, the system analyzes the time-series signals to identify at-risk disk drives that have an elevated risk of failure. If one or more disk drives are identified as being at-risk, the system performs a proactive resilvering operation on the disk array using a background process while the disk array continues to operate using the at-risk disk drives.

In some embodiments, while analyzing the time-series signals to identify at-risk disk drives, the system uses an inferential model trained on previously received time-series signals associated with the disk array to generate estimated values for the time-series signals based on correlations among the time-series signals. Next, the system performs a pairwise differencing operation between actual values and the estimated values for the time-series signals to produce residuals. Finally, the system performs a sequential probability ratio test (SPRT) on the residuals to identify one or more at-risk disk drives that have an elevated risk of failure.

In some embodiments, the system also estimates a remaining-useful life (RUL) for an at-risk disk drive.

In some embodiments, while estimating the RUL for the at-risk disk drive, the system: determines a rate at which the SPRT is generating alarms associated with the at-risk disk drive; and applies a linear logistic regression model to the determined rate to estimate the RUL for the at-risk disk drive.

In some embodiments, the system adjusts a priority of the background process based on estimated RULs for at-risk disk drives to ensure that the proactive resilvering operation completes before an at-risk disk drive fails.

In some embodiments, when the resilvering process completes and successfully produces a copy of an at-risk disk drive from redundant data stored on other drives in the disk array, the system swaps the at-risk disk drive for the copy of the at-risk disk drive while the disk array continues to operate.

In some embodiments, the received time-series signals include information specifying one or more of the following for each disk drive in the disk array and/or a server associated with the disk array: a load; a throughput; a utilization factor; a queue length; a transaction latency; an I/O rate; an idle time; read errors; write errors; read retries; write retries; temperatures; vibrations; and voltages.

In some embodiments, the disk array comprises a RAID array, which uses disk striping to distribute and redundantly store data across multiple physical disk drives in a manner that facilitates data recovery after a disk drive failure.

DETAILED DESCRIPTION

Figure 1:
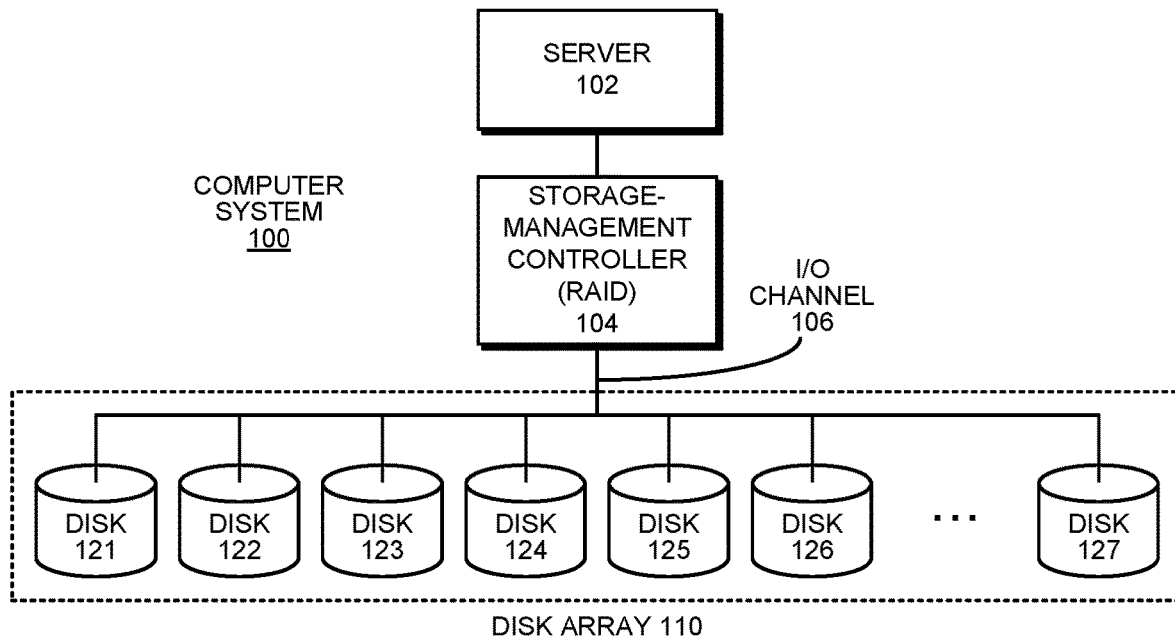
FIG. 1 illustrates an exemplary computer system with a striped disk array in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a system that performs "predictive resilvering" for at-risk disk drives in a disk array. During operation, the system uses early risk warnings generated through advanced pattern-recognition techniques to initiate a low-level background process that commences incrementally resilvering an at-risk disk drive well before the drive fails. The system also dynamically controls the rate of resilvering based on a remaining-useful-life (RUL) estimation to ensure that the proactive resilvering operation completes before an at-risk disk drive fails. By initiating the resilvering process before an at-risk drive fails, this innovation substantially reduces the probability of partner-pair failures in striped disk arrays. In contrast, existing RAID-based disk arrays do not start "resilvering" until a disk drive actually fails.

Note that there exist two ways to diminish the probability of catastrophic data loss from partner-pair failures in a disk array: (1) the system can mirror the entire array, or (2) the system can reduce the resilvering time. By reducing resilvering time, our system reduces the probability of "partner-pair failures" (and associated catastrophic data corruption) by orders of magnitude without incurring the significant expense involved in double-mirroring or quadruple-mirroring disk arrays in systems where business-critical data cannot be corrupted.

Computer System

For example, FIG. 1 illustrates an exemplary computer system 100 with a disk array 110 in accordance with the disclosed embodiments. Disk array 110 includes a set of disk drives 121-127, which are accessed in parallel through an I/O channel 106. Data from disk array 110 is processed by a server 102, which includes one or more processors and associated RAM memory.

Disk array 110 is controlled by a storage-management controller 104, which ensures that data is "striped" across disk drives 121-127 to facilitate both high-speed parallel accesses and fault tolerance. The disk striping pattern can be based on any one of a number of well-known RAID-based storage techniques. (For example, see Chen, Peter; Lee, Edward; Gibson, Garth; Katz, Randy; Patterson, David (1994). "RAID: High-Performance, Reliable Secondary Storage." *ACM Computing Surveys*. 26: 145-185.) Note that storage-management controller 104 also controls the proactive resilvering process as is described in more detail below.

Figure 2:
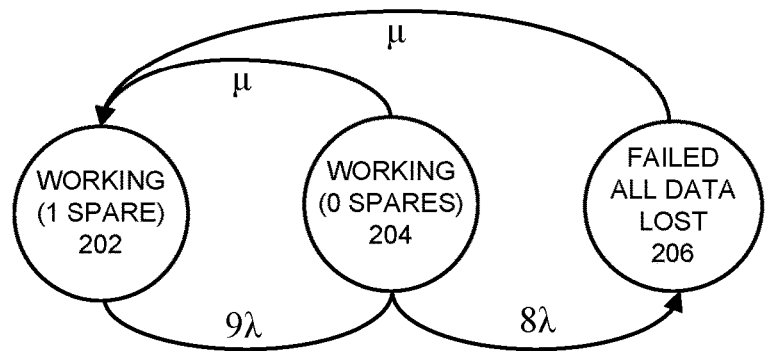
FIG. 2 illustrates a Markov availability model for computing the probability of a partner-pair failure in a striped disk array in accordance with the disclosed embodiments.

FIG. 2 illustrates a Markov availability model, which is applied to computing a partner-pair failure probability for an exemplary RAID disk array configuration in accordance with the disclosed embodiments. This exemplary RAID disk array configuration includes nine disk drives in total, with eight active disk drives and one "hot spare" drive. The Markov model illustrated in FIG. 2 includes three states: (1) a "working" state 202, wherein the system has one spare disk drive; a "working" state 204, wherein one disk drive has failed and the system consequently has zero spare disk drives; and (3) a "failed" state 206, wherein two or more disk drives have failed and consequently all of the data is lost.

Figure 3:
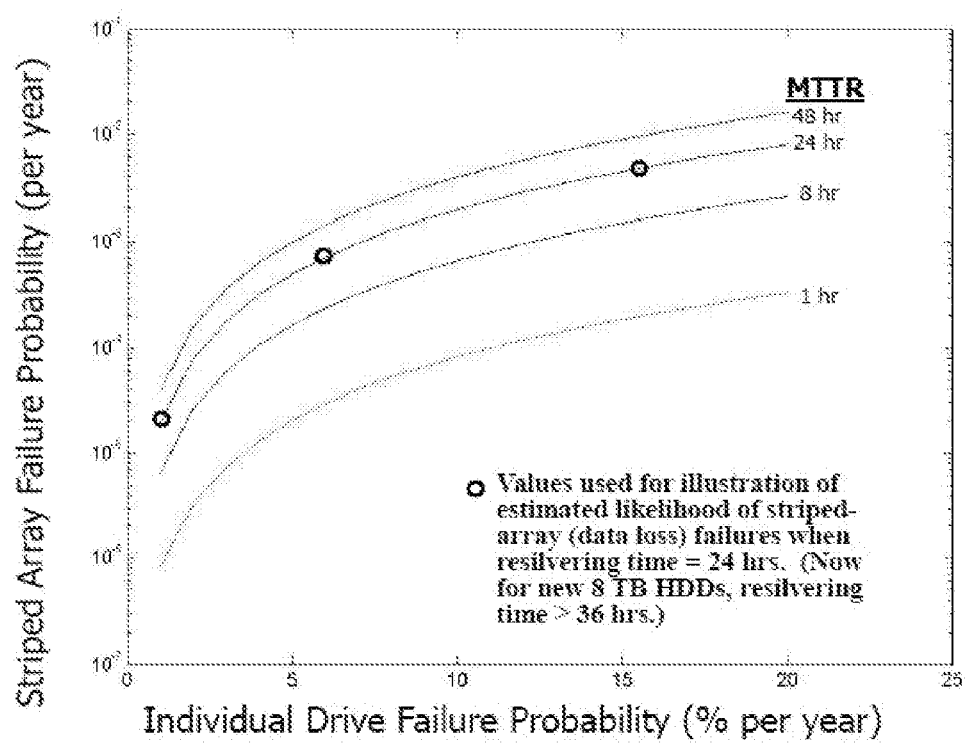
FIG. 3 presents a graph illustrating the failure probability of a disk array with respect to individual drive failure probabilities and the resilvering time for a first failed drive in accordance with the disclosed embodiments.

FIG. 3 presents a graph illustrating the failure probability for this exemplary RAID disk array configuration with respect to individual drive failure probability and resilvering time for a first failed drive in accordance with the disclosed embodiments. As illustrated in FIG. 3, assuming a 24-hour resilvering time, the probability of catastrophic data loss goes up by a factor of 250 compared with when resilvering times are less than one hour. Hence, the "predictive resilvering" technique introduced in this disclosure can greatly reduce the probability of catastrophic data loss by three orders of magnitude for arrays containing 1 TB HDDs. (Note that for new 8 TB HDDs, the resilvering times have climbed to 36 hours, so the probability of catastrophic data loss will rise even higher.)

Figure 4:
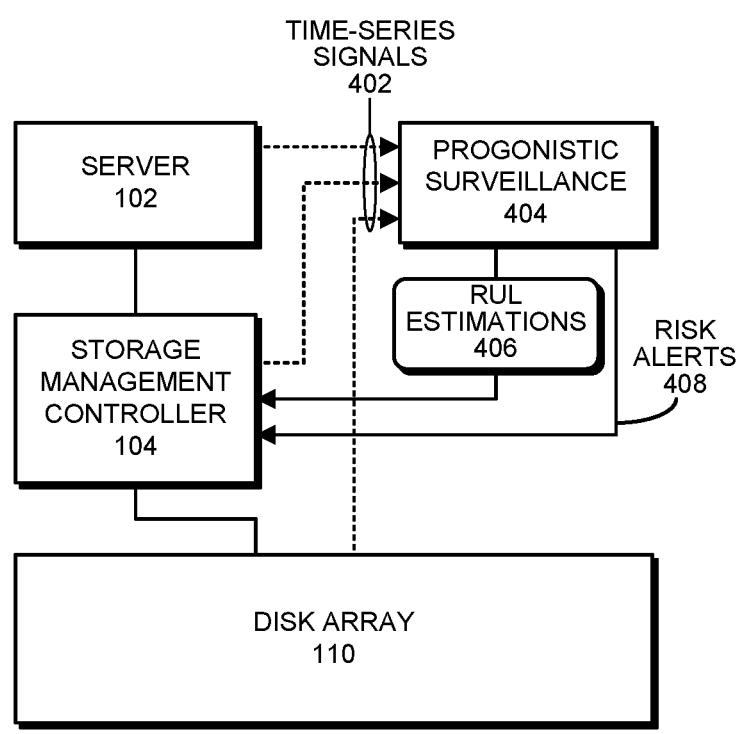
FIG. 4 presents a dataflow diagram for a predictive resilvering system for a disk array in accordance with the disclosed embodiments.

FIG. 4 presents a dataflow diagram of a system that performs proactive resilvering for a disk array in accordance with the disclosed embodiments. The system includes a server 102, a storage-management controller 104 and a disk array 110. A set of time-series signals 402 from server 102, storage-management controller 104 and disk array 110 feeds into a prognostic-surveillance module 404. As mentioned above, these time-series signals 402 can include information specifying one or more of the following for each disk drive in the disk array: a load; a throughput; a utilization factor; a queue length; an idle time; read errors; write errors; read retries; write retries; temperatures; vibrations; and voltages.

Prognostic-surveillance module 404 analyzes time-series signals 402 (as is described in more detail below) to generate risk alerts 408 and remaining-useful-life (RUL) estimations 406 which are used by storage-management controller 104 to initiate and control the proactive resilvering process as is described in more detail below.

Prognostics-Surveillance Module

Figure 5:
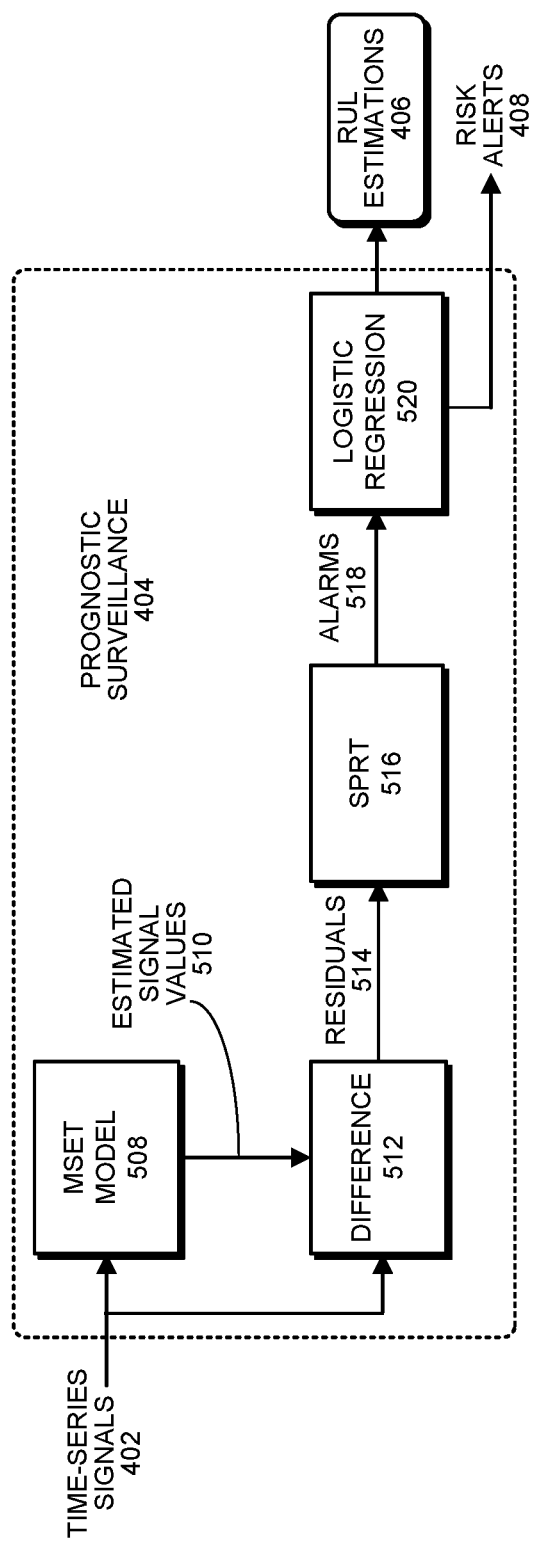
FIG. 5 illustrates the structure of a prognostic-surveillance module in accordance with the disclosed embodiments.

FIG. 5 illustrates an exemplary prognostic-surveillance module 404 in accordance with the disclosed embodiments. As illustrated in FIG. 5, prognostic-surveillance module 404 operates on a group of time-series signals 402 obtained from server 102, storage-management controller 104 and disk array 110.

During operation of prognostic-surveillance module 404, the time-series signals 402 are used to train an MSET pattern-recognition model 508 Note that although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

During the training process, MSET model 508 is trained to learn patterns of correlations among all of the time-series signals 402. This training process involves a one-time, computationally intensive calculation, which is performed offline with accumulated data that contains no anomalies. The pattern-recognition system is then placed into a "real-time surveillance mode," wherein the trained MSET model 508 predicts what each signal should be, based on other correlated variables to produce "estimated signal values" 510.

Next, the system uses a difference module 512 to perform a pairwise differencing operation between the actual time-series signal values 402 and the estimated signal values 510 to produce residuals 514. These residuals 514 can be calculated using the following expression: R(t)=X(t)−MSET(X(t)). While calculating residuals 514, the system filters the dynamics in the signals X(t) so that the residual R(t) is a stationary random process when the system is in good condition. Note that as the system ages or degrades due to a failure mechanism, the statistical properties of the residuals 514 change.

The system then performs a "detection operation" on the residuals 514 using a Sequential Probability Ratio Test (SPRT) module 516 to detect anomalies and to generate corresponding alarms 518. (For a description of the SPRT, please see Wald, Abraham, June 1945, "Sequential Tests of Statistical Hypotheses." *Annals of Mathematical Statistics.* 16 (2): 117-186.) Next, SPRT module 516 applies a sequential probability ratio test to residuals 514 and produces an alarm when one or more of the residuals 514 become statistically different from the residual corresponding to the un-degraded condition of the system. As the degradation progresses, the tripping frequency of the alarms produced by SPRT module 516 increases. These alarm-tripping frequencies are denoted as F=[F_1, . . . F_m], where F(t)=[F_1 (t), . . . F_m(t)] is the value of the prognostic parameters at time t. Hence, at time t, F(t)=SPRT(R(t)).

Logistic regression module 520 then records each instance of SPRT module 516 tripping an alarm, and uses these recorded instances to determine the current alarm-tripping frequency for SPRT module 516. Logistic regression module 520 then calculates the RUL of the computer system in the following way. We denote the probability of a disk drive to fail within the next T hours given the current condition determined by the current SPRT alarm-tripping frequencies F as p(T, F). The relationship between the p and the current condition F is modeled using the linear logistic regression model:

$$p(T,X)=1/(1+\exp(-(a(T)+b\_1(T)*F\_1+b\_2(T)*F\_2+ \ldots +b\_m(T)*F\_m))).$$

where a(T) and b(T)=[b_1(T), . . . , b_m(T)] are estimated from historical or experimental failure data for the system.

The disclosed embodiments then calculate RUL estimations 406 for a time T given an SPRT alarm-tripping frequency F. (For additional details about computing RUL estimations 406, see U.S. Pat. No. 7,702,485, entitled "Method and Apparatus for Predicting a Remaining Useful Life for a Computer System," by inventors Kenny C. Gross, et al., filed on 6 Dec. 2006, which is hereby incorporated herein by reference.) Note that logistic regression module 520 also generates risk alerts 408, which indicate that one or more disk drives are at-risk for failure. In this way, prognostic-surveillance module 404 can generate alerts about incipient anomalies, such as impending failures or malicious intrusion events.

It has been demonstrated that the MSET technique can be adapted to monitor host-side "kstat" and "IOstat" telemetry metrics to infer the incipience and onset of anomalies in storage-side individual HDDs. (See "Incipient Fault Detection in Storage Systems using On-Line Pattern Recognition," by K. Vaidyanathan, K. C. Gross and R. Dhanekula, Proc. 60th Meeting of the Society for Machinery Failure Prevention Technology (MFPT60), Virginia Beach, Va. April 2006.)

However, it is not sufficient to know that an individual drive in a disk array is at elevated risk of failure. What is needed is a technique that is capable of continuously updating estimates of the RUL of any HDD (or combination of multiple HDDs), which have been flagged as being at elevated risk. For example, if a low-level background process is initiated to start resilvering an array, but the priority for the background process is set so low that the resilvering may take a week, but the first at-risk HDD is likely to fail in 5 hours, then the predictive resilvering process is not much better than the present practice of initiating resilvering after the first failure occurs.

To remedy this problem, in the disclosed embodiments, the priority of the background resilvering process is dynamically controlled based on continuously updated RUL estimates for HDDs identified as having an elevated risk of failure. This dynamically controlled, proactive resilvering technique will increase the priority of the background process and accelerate the rate of resilvering as necessary to maintain a very high probability of completing the resilvering before the first HDD fails. In rare circumstances, this may adversely affect the performance of the disk array during the final stages of the resilvering process. However, this is orders of magnitude less performance impact than if a "partner-pair failure" occurs and takes down an entire storage array.

Process of Caching Time-Series Data

Figure 6:
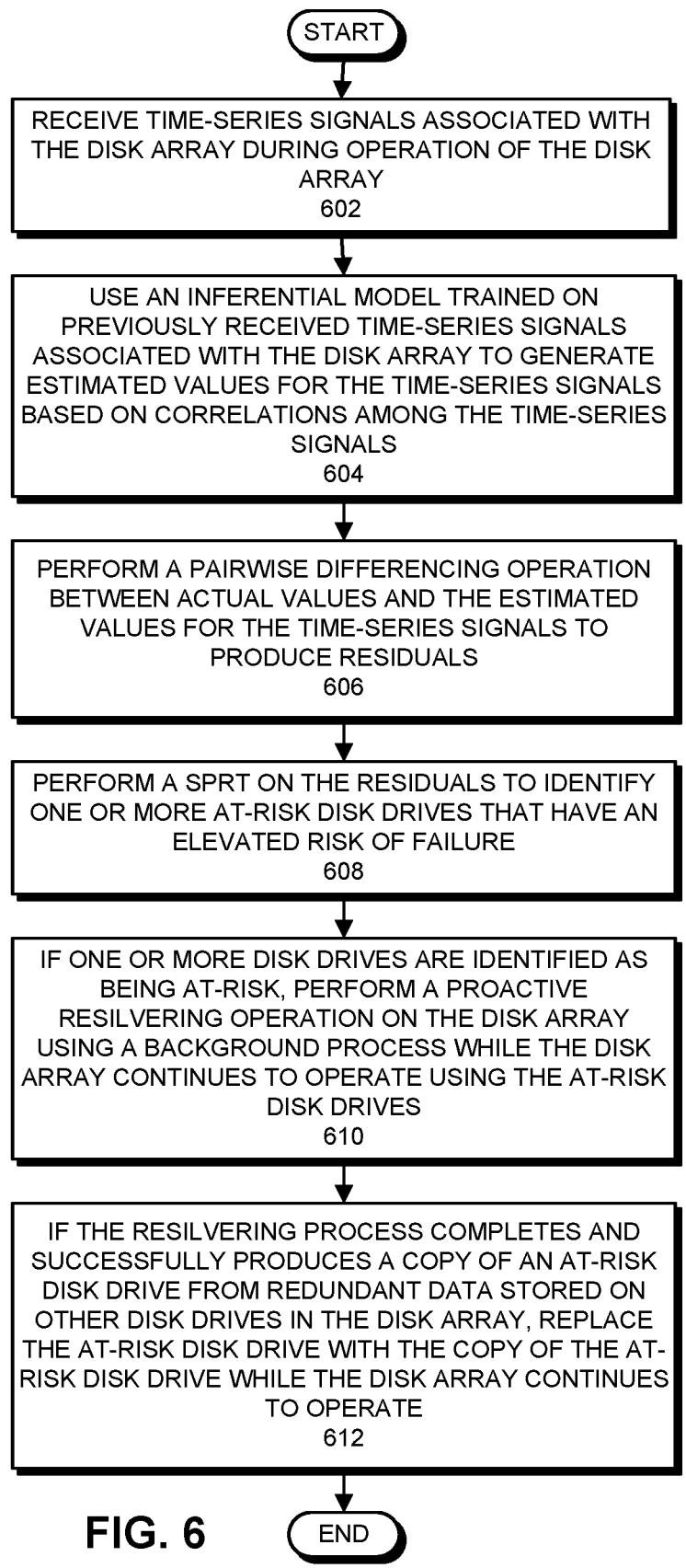
FIG. 6 presents a flow chart illustrating operations performed by a predictive resilvering system in accordance with the disclosed embodiments.

FIG. 6 presents a flow chart illustrating operations performed by a system that performs predictive resilvering in accordance with the disclosed embodiments. During operation, the system receives time-series signals associated with the disk array during operation of the disk array (step 602). Next, the system uses an inferential model trained on previously received time-series signals associated with the disk array to generate estimated values for the time-series signals based on correlations among the time-series signals (step 604). Next, the system performs a pairwise differencing operation between actual values and the estimated values for the time-series signals to produce residuals (step 606). Then, the system performs a sequential probability ratio test (SPRT) on the residuals to identify one or more at-risk disk drives that have an elevated risk of failure (step 608). If one or more disk drives are identified as being at-risk, the system performs a proactive resilvering operation on the disk array using a background process while the disk array continues to operate using the at-risk disk drives (step 610). Finally, if the resilvering process completes and successfully produces a copy of an at-risk disk drive from redundant data stored on other disk drives in the disk array, the system replaces the at-risk disk drive with the copy of the at-risk disk drive while the disk array continues to operate (step 612).

Figure 7:
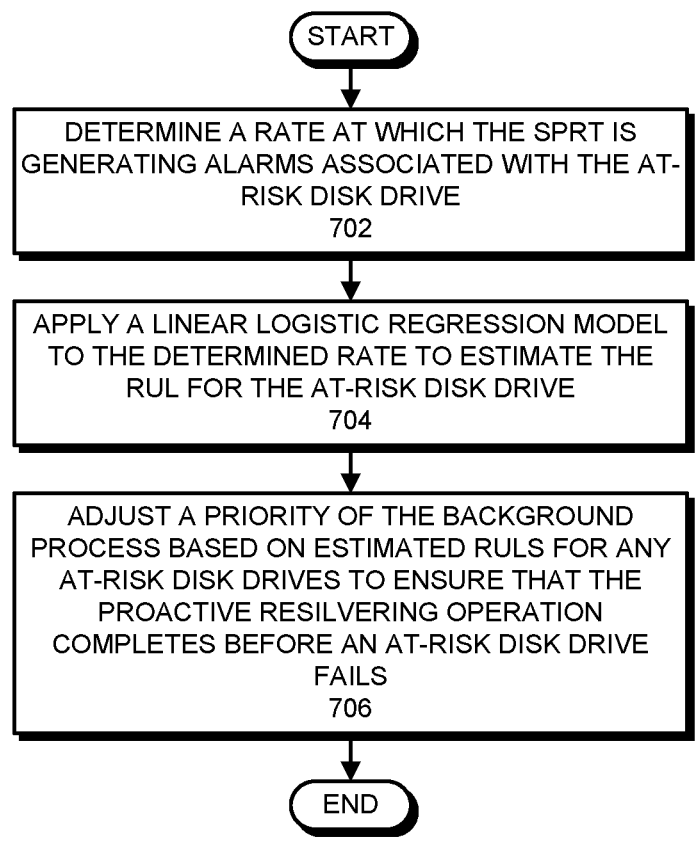
FIG. 7 presents a flow chart illustrating operations performed by the predictive resilvering system, which are associated with computing an RUL, in accordance with the disclosed embodiments.

FIG. 7 presents a flow chart illustrating operations performed by the predictive resilvering system, which are associated with an RUL computation in accordance with the disclosed embodiments. During operation, the system estimates an RUL for an at-risk disk drive. This involves first determining a rate at which the SPRT is generating alarms associated with the at-risk disk drive (step 702), and then applying a linear logistic regression model to the determined rate to estimate the RUL for the at-risk disk drive (step 704). Next, the system adjusts a priority of the background process based on estimated RULs for any at-risk disk drives to ensure that the proactive resilvering operation completes before an at-risk disk drive fails (step 706).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for proactively resilvering a disk array when a disk drive in the array is determined to have an elevated risk of failure, comprising:
   receiving time-series signals associated with the disk array during operation of the disk array;
   analyzing the received time-series signals to identify at-risk disk drives that have an elevated risk of failure by:
      using an inferential model trained on previously received time-series signals associated with the disk array to generate estimated values for the time-series signals based on correlations among the time-series signals,
      performing a pairwise differencing operation between actual values and the estimated values for the time-series signals to produce residuals, and
      performing a sequential probability ratio test (SPRT) on the residuals to identify one or more at-risk disk drives that have an elevated risk of failure; and
   when one or more disk drives are identified as being at-risk, performing a proactive resilvering operation on the disk array using a background process while the disk array continues to operate using the at-risk disk drives.

2. The method of claim 1, further comprising estimating a remaining-useful life (RUL) for an at-risk disk drive.

3. The method of claim 2, wherein estimating the RUL for an at-risk disk drive comprises:
   determining a rate at which the SPRT is generating alarms associated with the at-risk disk drive; and
   applying a linear logistic regression model to the determined rate to estimate an RUL for the at-risk disk drive.

4. The method of claim 2, further comprising adjusting a priority of the background process based on estimated RULs for at-risk disk drives to ensure that the proactive resilvering operation completes before an at-risk disk drive fails.

5. The method of claim 1, wherein when the resilvering process completes and successfully produces a copy of an at-risk disk drive from redundant data stored on other disk drives in the disk array, the method further comprises replacing the at-risk disk drive with the copy of the at-risk disk drive while the disk array continues to operate.

6. The method of claim 1, wherein the received time-series signals include information specifying one or more of the following for each disk drive in the disk array and/or a server associated with the disk array:
   a load;
   a throughput;
   a utilization factor;
   a queue length;
   a transaction latency;
   an I/O rate;
   an idle time;
   read errors;
   write errors;
   read retries;
   write retries;
   temperatures;
   vibrations; and
   voltages.

7. The method of claim 1, wherein the disk array comprises a RAID array, which uses disk striping to distribute and redundantly store data across multiple physical disk drives in a manner that facilitates data recovery after a disk drive failure.

8. A non-transitory, computer-readable storage medium storing instructions that when executed by a computer cause the computer to perform a method for proactively resilvering a disk array when a disk drive in the array is determined to have an elevated risk of failure, the method comprising:
   receiving time-series signals associated with the disk array during operation of the disk array;
   analyzing the received time-series signals to identify at-risk disk drives that have an elevated risk of failure by:
      using an inferential model trained on previously received time-series signals associated with the disk array to generate estimated values for the time-series signals based on correlations among the time-series signals,
      performing a pairwise differencing operation between actual values and the estimated values for the time-series signals to produce residuals, and
      performing a sequential probability ratio test (SPRT) on the residuals to identify one or more at-risk disk drives that have an elevated risk of failure; and
   when one or more disk drives are identified as being at-risk, performing a proactive resilvering operation on the disk array using a background process while the disk array continues to operate using the at-risk disk drives.

9. The non-transitory, computer-readable storage medium of claim 8, wherein the method further comprises estimating a remaining-useful life (RUL) for an at-risk disk drive.

10. The non-transitory, computer-readable storage medium of claim 9, wherein estimating the RUL for an at-risk disk drive comprises:
   determining a rate at which the SPRT is generating alarms associated with the at-risk disk drive; and
   applying a linear logistic regression model to the determined rate to estimate an RUL for the at-risk disk drive.

11. The non-transitory, computer-readable storage medium of claim 9, wherein the method further comprises adjusting a priority of the background process based on estimated RULs for at-risk disk drives to ensure that the proactive resilvering operation completes before an at-risk disk drive fails.

12. The non-transitory, computer-readable storage medium of claim 8, wherein when the resilvering process completes and successfully produces a copy of an at-risk disk drive from redundant data stored on other disk drives in the disk array, the method further comprises replacing the at-risk disk drive with the copy of the at-risk disk drive while the disk array continues to operate.

13. The non-transitory, computer-readable storage medium of claim 8, wherein the received time-series signals include information specifying one or more of the following for each disk drive in the disk array and/or a server associated with the disk array:
 a load;
 a throughput;
 a utilization factor;
 a queue length;
 a transaction latency;
 an I/O rate;
 an idle time;
 read errors;
 write errors;
 read retries;
 write retries;
 temperatures;
 vibrations; and
 voltages.

14. The non-transitory, computer-readable storage medium of claim 8, wherein the disk array comprises a RAID array, which uses disk striping to distribute and redundantly store data across multiple physical disk drives in a manner that facilitates data recovery after a disk drive failure.

15. A system that proactively resilvers a disk array when a disk drive in the array is determined to have an elevated risk of failure, comprising:

at least one processor and at least one associated memory; and a proactive resilvering mechanism that executes on the at least one processor, wherein during operation, the proactive resilvering mechanism:
 receives time-series signals associated with the disk array during operation of the disk array;
 analyzes the received time-series signals to identify at-risk disk drives that have an elevated risk of failure by:
  using an inferential model trained on previously received time-series signals associated with the disk array to generate estimated values for the time-series signals based on correlations among the time-series signals,
  performing a pairwise differencing operation between actual values and the estimated values for the time-series signals to produce residuals, and
  performing a sequential probability ratio test (SPRT) on the residuals to identify one or more at-risk disk drives that have an elevated risk of failure; and
 when one or more disk drives are identified as being at-risk, performs a proactive resilvering operation on the disk array using a background process while the disk array continues to operate using the at-risk disk drives.

16. The system of claim 15, wherein the proactive resilvering mechanism additionally estimates a remaining-useful life (RUL) for an at-risk disk drive.

17. The system of claim 16, wherein the proactive resilvering mechanism adjusts a priority of the background process based on estimated RULs for at-risk disk drives to ensure that the proactive resilvering operation completes before an at-risk disk drive fails.

* * * * *